No. 778,085. Patented December 20, 1904.

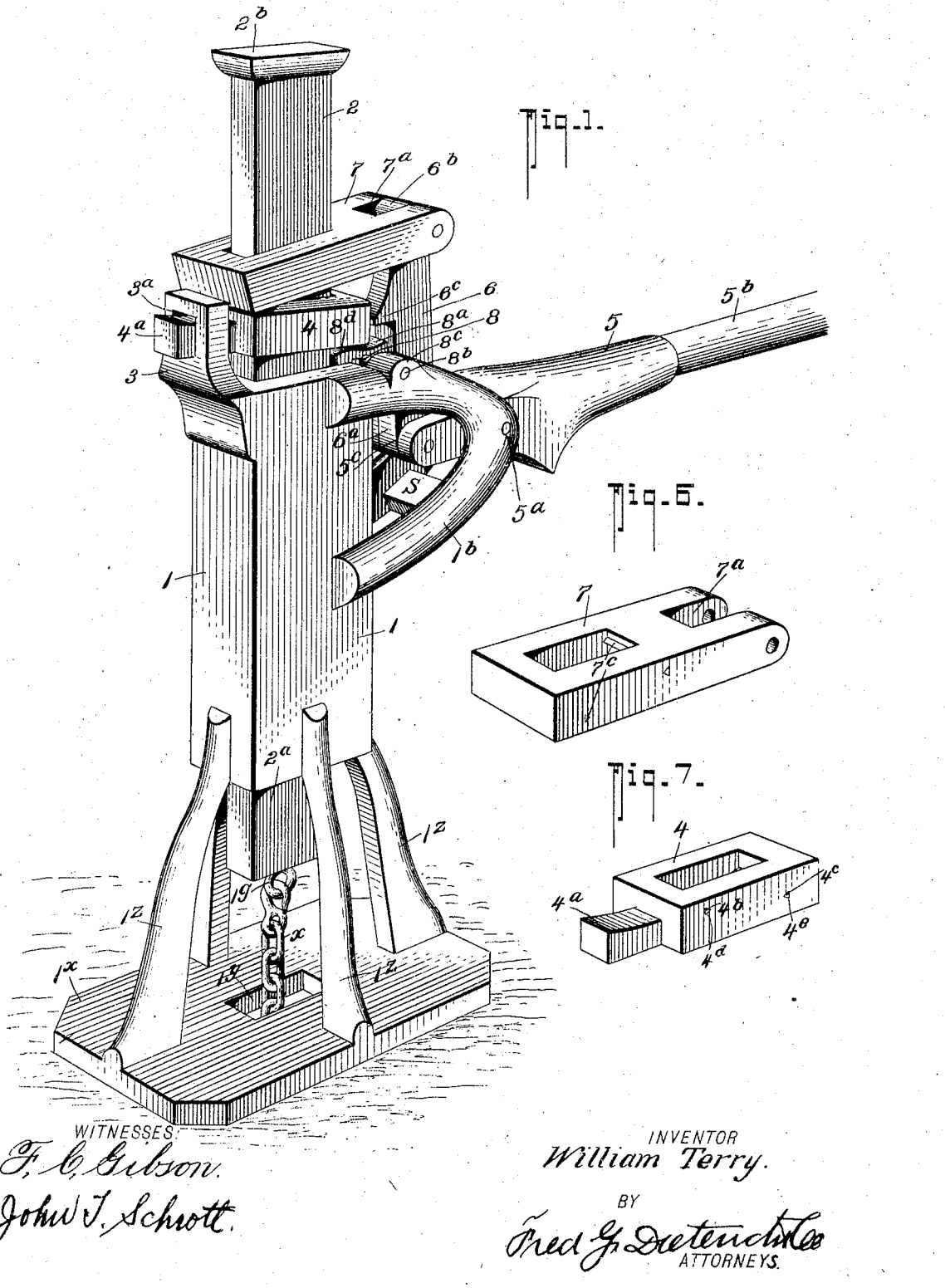

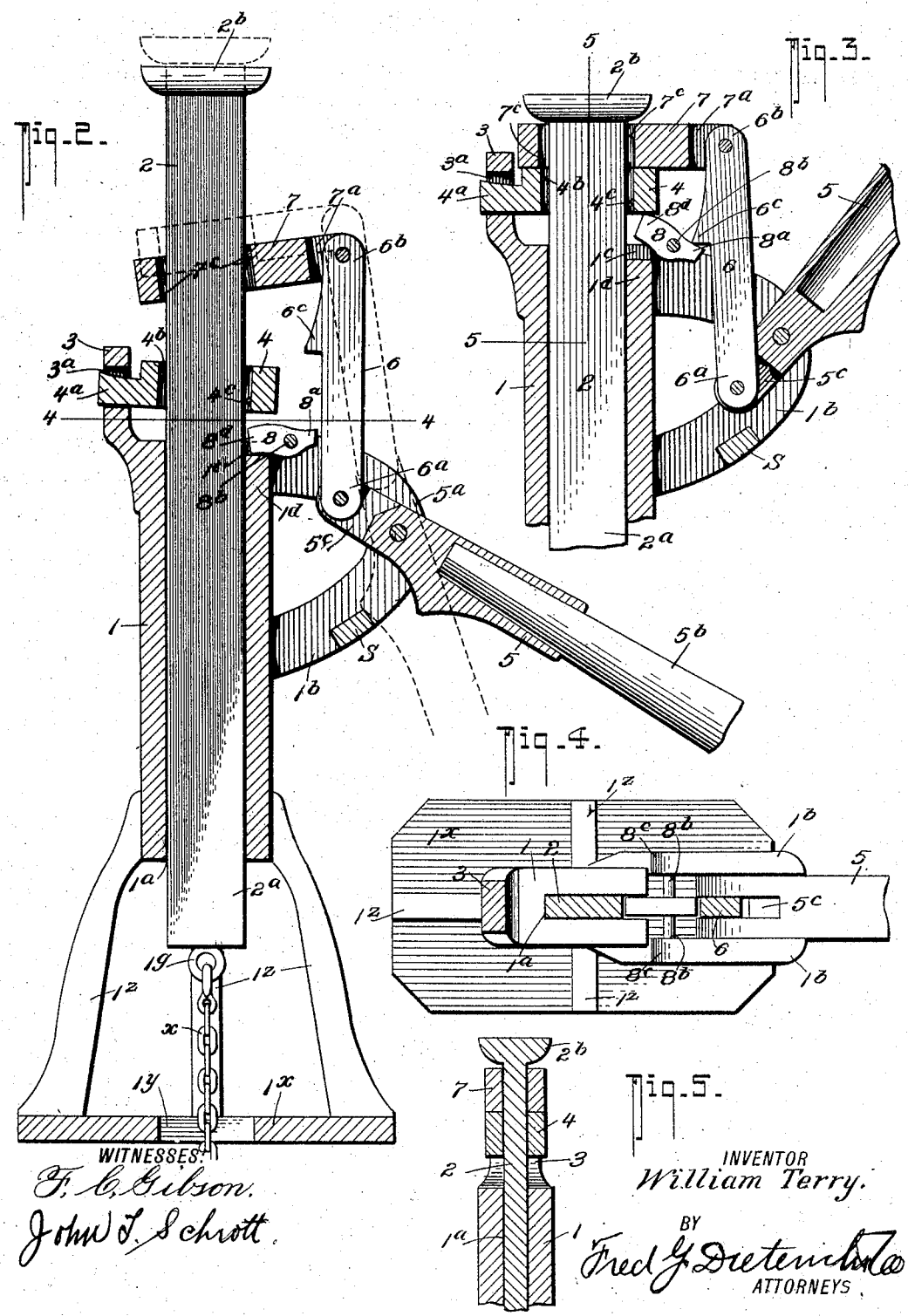

UNITED STATES PATENT OFFICE.

WILLIAM TERRY, OF PEARL CITY, ILLINOIS.

LIFTING-JACK.

SPECIFICATION forming part of Letters Patent No. 778,085, dated December 20, 1904.

Application filed February 26, 1904. Serial No. 195,356.

*To all whom it may concern:*

Be it known that I, WILLIAM TERRY, residing at Pearl City, in the county of Stephenson and State of Illinois, have invented certain new and useful Improvements in Lifting-Jacks, of which the following is a specification.

My invention relates to the class of lifting-jacks in which a bar, lever, and clutch-loops are employed, and it more particularly seeks to provide a jack of this character of a simple, effective, and easily-operable construction and which will readily serve its intended purposes.

In its generic nature the invention consists of an elongated body mounted upon a suitable base and adapted to receive a lifting-bar, a lever fulcrumed to said body and being connected with a loop held around the bar, a second loop around the bar and engaging the body member, and means for releasing the bar to permit it to drop down at predetermined times.

Again, my invention includes certain novel combinations and arrangement of parts, all of which is described in detail and then specifically pointed out in the appended claims, reference being had to the accompanying drawings, in which—

Figure 1 is a perspective view of my improved lifting-jack. Fig. 2 is a longitudinal section thereof, the bar being shown partially elevated. Fig. 3 is a similar view, the parts being shown in their bar-releasing position. Fig. 4 is a cross-section taken on the line 4 4 of Fig. 2. Fig. 5 is a similar view on the line 5 5 of Fig. 2. Fig. 6 is a detail perspective view of the upper loop. Fig. 7 is a similar view of the lower loop.

Referring now to the accompanying drawings, in which like numerals and letters of reference indicate like parts in all of the figures, 1 designates a body member, preferably rectangular in cross-section and which has a longitudinal aperture $1^a$ to receive a lifting-bar 2, comprising the bar member $2^a$ of similar cross-section to the body member and having a head or bearing member $2^b$, as clearly shown in Figs. 1, 2, and 3. The body member 1 is mounted upon a base $1^x$ by legs $1^z$, and the said base is apertured, as at $1^y$, to receive the end of the bar 2 for a purpose presently to appear.

3 designates a projecting portion secured to the body 1, and the said portion 3 has a slot $3^a$ to receive the tongue $4^a$ of the lower loop 4, which surrounds the bar 2, and is provided with biting-teeth $4^b$ $4^c$, which engage the bar 2 at predetermined times. The teeth $4^b$ $4^c$ are arranged at the upper and lower edges, respectively, of the loop and on opposite ends thereto. These teeth are removably held in apertures $4^d$ $4^e$, so that should they become worn or broken they can be readily removed and new ones substituted in lieu thereof.

Pivotally mounted on bearings $5^a$ on the arms $1^b$ $1^b$, secured to the body 1, is a lever-socket 5, suitably apertured to receive the lever-handle $5^b$, and the said socket 5 also has a bifurcated portion $5^c$ to receive the lower end $6^a$ of a link 6, to the upper end $6^b$ of which the upper loop 7 is pivotally secured. The upper loop 7 also has a bifurcated portion $7^a$ to receive the link end $6^b$ of the link 6. The link 6 also includes a right-angle shoulder or projection $6^c$ for coöperating with the heel $8^a$ of the trip member 8, which is fulcrumed, as at $8^b$, in the bearing portions $8^c$ of the arms $1^b$ $1^b$, and the said trip member has a loop-engaging portion $8^d$, which normally rests in a cut-away portion or socket $1^c$ in the upper edge $1^d$ of the body member 1, as will be clearly understood by reference to Fig. 2. The upper loop 7 also includes biting-teeth $7^c$ of like arrangement and construction as those of the lower loop 4. The loops 4 and 7 are constructed of such material that they will normally tend to gravitate downward to bring their respective biting-teeth into engagement with the surface of the bar, as shown in Fig. 2.

The lower end of the bar 2 may be provided with a suitable eye $1^g$, to which a chain $x$ may be attached, passing through the aperture in the base member, so that the jack may be used from above the object to be worked upon as well as by placing it under the object.

To limit the movement of the lever, I provide a stop $s$ on the arms $1^b$ $1^b$, as shown.

From the foregoing description it will be seen that by a movement of the lever in an oscillatory manner the upper loop 7 may be alternately raised and lowered with respect to the bar 2 and the body 1 to raise the bar in the manner shown in Fig. 2 of the drawings. Should it be desired to release the said bar, it is only necessary to move the lever to the position shown in Fig. 3, when the shoulder $6^c$ of the link 6 will engage the heel $8^a$ of the trip member 8 and cause it to lift the lower loop 4 to a horizontal position, which lower loop will engage the upper loop 7 at the same time and hold it also in a horizontal position. This will cause the biting-teeth to be disengaged from the bar, which will then gravitate to its lowermost position, as clearly shown in Fig. 3 of the drawings.

From the foregoing description, taken in connection with the accompanying drawings, it is thought the operation, advantages, and complete construction of my invention will be readily understood by those skilled in the art to which it appertains.

I am aware that lifting-jacks have heretofore been provided in which a lever is used with loop connections to operate a lifting-bar. I am also aware that separate and independent operating release devices have been provided for releasing the bar to permit it to drop down to its normal position, and I therefore do not broadly claim such construction; but what I do claim, and desire to secure by Letters Patent, is set out in the claims hereunto attached, and I desire it understood that slight changes in the detailed arrangement and combination of parts may be made without departing from the scope of the invention or the appended claims.

Having thus described my invention, what I claim, and desire to secure by Letters Patent, is—

1. In a lifting-jack, a body having arms and a longitudinal aperture, a lifting-bar vertically movable in said body-aperture, said body having a projection, a loop surrounding said bar and held by said projection, a lever fulcrumed to said body-arms, and a second loop surrounding said bar and connected with said lever, said loops serving to normally grip said bar, and means for engaging said lower loop to release said bar at predetermined times.

2. In a lifting-jack, a body having a projection and having arms, said projection having an aperture, a lifting-bar vertically movable in said body, a loop surrounding said bar, said loop having a tongue for entering the aperture of said body projection, a lever fulcrumed to said body-arms, a second loop located above the first-mentioned loop and surrounding said bar, a link connection between said second loop and said lever, and means for engaging said lower loop to release said bar.

3. In a lifting-jack, a body having a projection and having arms, said projection having an aperture, a lifting-bar vertically movable in said body, a loop surrounding said bar, said loop having a tongue for entering the aperture of said body projection, a lever fulcrumed to said body-arms, a second loop located above the first-mentioned loop and surrounding said bar, a link connection between said second loop and said lever, and means for engaging said lower loop to release said bar, said means including a trip member fulcrumed to said body-arms.

4. In a lifting-jack, a body having an apertured projection and bearing-arms, said body portion being longitudinally apertured, a lifting-bar vertically moving in said bar, a loop surrounding said bar and having a tongue for coöperating with the apertured projection of the body, a second loop surrounding said bar above said first-mentioned loop, a lever fulcrumed to said body-arms, a link for connecting the lever to the upper loop, said link having a shoulder, a trip member pivotally mounted on said body-arms and adapted to be engaged by said link projection at predetermined times to cause said trip to engage said first loop and raise it to engagement with said second loop to release the bar for the purposes specified.

5. In a lifting-jack, a body portion having an apertured projection and bearing-arms, an apertured base member, said body portion being mounted on said apertured base member, a lifting-bar vertically movable in said body over said base-aperture, a loop surrounding said bar and having a tongue loosely held in said aperture of said body projection, a lever fulcrumed to said body-arms, a second loop arranged above said lifting-bar, a link connection between said second loop and said lever, a trip member mounted on said body-arms adapted to be engaged by said link member during the upward movement of the lever to engage said loops to release the lifting-bar, said lifting-bar being adapted when in its lowermost position to rest with its lower end in said base-aperture, substantially as shown and described.

WILLIAM TERRY.

Witnesses:
J. D. BEHRINGER,
HARRY BARNES.